United States Patent
Yoshida et al.

(10) Patent No.: US 9,158,009 B2
(45) Date of Patent: Oct. 13, 2015

(54) SCINTILLATOR PANEL AND RADIATION DETECTOR

(75) Inventors: Atsuya Yoshida, Nasushiobara (JP); Hiroshi Horiuchi, Otawara (JP)

(73) Assignees: KABUSHIKI KAISHA TOSHIBA, Tokyo (JP); TOSHIBA ELECTRON TUBES & DEVICES CO., LTD., Tochigi-Ken (JP)

( * ) Notice: Subject to any disclaimer, the term of this patent is extended or adjusted under 35 U.S.C. 154(b) by 0 days.

(21) Appl. No.: 12/565,324

(22) Filed: Sep. 23, 2009

(65) Prior Publication Data

US 2010/0006762 A1    Jan. 14, 2010

Related U.S. Application Data

(63) Continuation of application No. PCT/JP2008/055696, filed on Mar. 26, 2008.

(30) Foreign Application Priority Data

Mar. 27, 2007    (JP) ................. 2007-080420

(51) Int. Cl.
*G01T 1/202*    (2006.01)
*C09K 11/61*    (2006.01)
(Continued)

(52) U.S. Cl.
CPC ............. *G01T 1/202* (2013.01); *C09K 11/613* (2013.01); *C09K 11/7733* (2013.01); *G21K 4/00* (2013.01); *G21K 2201/06* (2013.01)

(58) Field of Classification Search
CPC ....... G01T 1/20; G01T 1/2002; G01T 1/2006; G01T 1/2018; G01T 1/202; G21K 4/00
USPC ................. 250/361 R, 484.4, 487.1
See application file for complete search history.

(56) References Cited

U.S. PATENT DOCUMENTS

2004/0178350 A1* 9/2004 Nagano et al. ........... 250/370.11
2004/0200973 A1   10/2004 Ogawa
(Continued)

FOREIGN PATENT DOCUMENTS

CN    1530667        9/2004
EP    0 233 497 A1   8/1987
(Continued)

OTHER PUBLICATIONS

International Search Report for PCT/JP2008/055696.
(Continued)

*Primary Examiner* — Walter L Lindsay, Jr.
*Assistant Examiner* — Jessica L Eley
(74) *Attorney, Agent, or Firm* — Pillsbury Winthrop Shaw Pittman, LLP

(57) ABSTRACT

A reflective resin sheet is bonded to one face of a supporting substrate transmitting a radiation ray and a resin sheet of the same material as that of the reflective resin sheet to the other face of the supporting substrate. A phosphor layer converting a radiation ray into visible light is formed additionally on the reflective resin sheet formed on one face of the supporting substrate. The phosphor layer is enclosed with an additional moisture-proof layer and the reflective resin sheet. It is possible to obtain a scintillator panel higher in sensitivity characteristics, stabilized in quality and more cost-effective by placing the reflective resin sheet between the supporting substrate and the phosphor layer.

4 Claims, 3 Drawing Sheets

(51) Int. Cl.
*C09K 11/77* (2006.01)
*G21K 4/00* (2006.01)

(56) References Cited

U.S. PATENT DOCUMENTS

| | | | |
|---|---|---|---|
| 2005/0077480 A1* | 4/2005 | Kishinami et al. | 250/484.4 |
| 2005/0274916 A1* | 12/2005 | Shoji et al. | 250/580 |
| 2006/0033032 A1* | 2/2006 | Inoue et al. | 250/370.11 |
| 2006/0038131 A9* | 2/2006 | Homme et al. | 250/370.11 |
| 2007/0200486 A1* | 8/2007 | Okanan et al. | 313/496 |

FOREIGN PATENT DOCUMENTS

| | | |
|---|---|---|
| EP | 1 523 014 A2 | 4/2005 |
| EP | 1 156 346 B1 | 10/2006 |
| EP | 1 231 483 B1 | 1/2013 |
| JP | 08-271637 | 10/1996 |
| JP | 10-090498 | 4/1998 |
| JP | 2002-236181 | 8/2002 |
| JP | 2003-075593 | 3/2003 |
| JP | 2003-177180 | 6/2003 |
| JP | 2004-212189 | 7/2004 |
| JP | 2005-114680 | 4/2005 |
| JP | 2005-308583 | 11/2005 |
| JP | 2006-058099 | 3/2006 |
| JP | 2006-178157 | 7/2006 |
| JP | 2006-226912 | 8/2006 |
| WO | WO 99/66350 | 12/1999 |

OTHER PUBLICATIONS

Japanese Office Action dated Aug. 23, 2011.
Chinese Office Action dated Sep. 21, 2011.
European Search Report dated Apr. 2, 2013.
Korean Office Action dated Jul. 1, 2011.
Japanese Office Action dated Dec. 3, 2013 for Appln. No. 2008-546625.

* cited by examiner

| | Lamination structure | Sensitivity | CTF (@2Lp/mm) |
|---|---|---|---|
| Conventional Example 1 | CFRP substrate /Al reflective film/500 μm CsI /poly-para-xylylene | 1.7 | 46 |
| Conventional Example 2 | CFRP substrate/reflective film of titanium oxide-dispersed resin paste/magnesium oxide protection film/500 μm CsI/poly-para-xylylene | 2.2 | 43 |
| Example | CFRP substrate/expanded PET reflection sheet/500 μm CsI/poly-para-xylylene | 2.4 | 43 |

F I G. 2

SCINTILLATOR PANEL AND RADIATION DETECTOR

CROSS-REFERENCE TO RELATED APPLICATIONS

This is a Continuation Application of PCT Application No. PCT/JP2008/055696, filed Mar. 26, 2008, which was published under PCT Article 21(2) in Japanese.

This application is based upon and claims the benefit of priority from prior Japanese Patent Application No. 2007-080420, filed Mar. 27, 2007, the entire contents of which are incorporated herein by reference.

BACKGROUND OF THE INVENTION

1. Field of the Invention

The present invention relates to a scintillator panel converting radiation rays to visible light and a radiation detector using the scintillator panel.

2. Description of the Related Art

Recent digitalized radiation detectors, such as those for medical tests or industrial nondestructive inspections, are mainly systems employing a method of converting incident X rays to visible light in a scintillator layer such as computed radiology (hereinafter, referred to as CR) and flat panel detectors (hereinafter, referred to as FPD).

Europium-added cesium bromide (CsBr:Eu) used as the phosphor layer in some CR systems and thallium-added cesium iodide (CsI:Tl) used in most FPDS are materials commonly used because they often have columnar crystals when produced by the vacuum deposition method.

For example, scintillator panels using CsI:Tl are usually produced by coating a reflective film on a radiation ray-permeable supporting substrate such as glass and forming a CsI film thereon. A protection film is occasionally formed additionally between the reflective and CsI films for protection of the reflective film.

An X ray entering the scintillator panel having such a structure through a subject from an X-ray source is converted into visible light by the scintillator. For example in the case of an X-ray photon, the photon is converted into visible light at the emission point in the phosphor layer. The light emitted at the emission point disperses in all directions, independently of the vector of the incident photon. Because the phosphor layer has a pillar structure, some of the emitted photons disperse out of the surface of the scintillator panel through the pillars, because of the difference in refractive index between pillars and the CsI layer (refractive index of CsI: 1.8). The light dispersed farther than the adjacent pillar is considered unlikely to travel through the optical interface between the many pillars in the surface direction of the phosphor layer, and thus is entrapped in one of the pillars at the interface and disperses out of the surface of the scintillator panel through the pillar. For the reasons above, the phosphor layer having a pillar structure has a function to transmit the emitted light to the next device (e.g., photodiode in the case of FPD) without light scattering, giving a scintillator layer having high-definition images.

The reflective film has a function to reflect the emitted light traveling in the supporting substrate direction to the CsI surface, and thus to improve the sensitivity of the scintillator panel.

For example, an FPD having a phosphor layer has a shape in which the scintillator panel is bonded to an image sensor having multiple photoreceptor elements arranged in a one- or two-dimensional array. The definition and sensitivity characteristics of FPDs in such a structure are influenced by the properties of the scintillator panel. In other words, the characteristics of the FPD are dependent on the pillar structure of CsI and the function of the reflective film (see, for example, Jpn. Pat. Appln. KOKAI Publication No. 2006-58099, pp. 4 to 5 and FIG. 3).

BRIEF SUMMARY OF THE INVENTION

As described above, the reflective film has influences on the sensitivity characteristics of the scintillator panel, and thus, it is very important in improving the sensitivity. Investigation on the sensitivity of the reflective film showed that reflective films based on a resin material were often higher in sensitivity than those based on a commonly-used metallic material. For example, a supporting substrate of a carbon fiber-reinforced plastic (hereinafter, referred to as CFRP) carrying an Al reflective film, a silver alloy reflective film and a MgO protective film, or a reflective film formed by coating a titanium oxide-dispersed resin paste and additionally a CsI film having a thickness of 500 µm formed thereon had a relative sensitivity of 1.8, 2.2, or 2.4, with respect to the sensitivity of the intensifying screen of 1.

However, silver-based reflective films easily blacken in color due to moisture absorption even if protected with a protection film, and are thus relatively unstable in quality. Alternatively, the reflective film formed by coating a titanium oxide-dispersed resin paste often shows high sensitivity characteristics, but unfavorably, irregularity in sensitivity is often observed because of coating irregularities of the resin paste, and the any irregularity in sensitivity is magnified during heating in the CsI-depositing step because of the low heat resistance of the resin.

Recently, for improvement in X-ray transmission, supporting substrates based on carbonic materials are mainly used in production of the scintillator panels. CFRPs are promising materials of carbon-based materials because they are relatively cheap and high in rigidity. However, when a resin paste is applied on such a CFRP supporting substrate, the surface of the supporting substrate is lower in wettability, which therefore makes it more difficult to form a uniform resin paste coating, possibly causing a problem of coating irregularity. Further, most resin pastes are heat-cured after application, which causes a problem of bending of the supporting substrate due to the difference in thermal expansion coefficient from that of the supporting substrate.

An object of the present invention, which was made under the circumstances above, is to provide a scintillator panel higher in sensitivity, stabilized in quality and more cost-effective, and a radiation detector using the scintillator panel.

In a scintillator panel according to an aspect of the present invention having a supporting substrate which transmits a radiation ray; a reflective resin sheet formed on one face of the supporting substrate; and a phosphor layer which is formed on the reflective resin sheet on one face of the supporting substrate and converts the radiation ray into visible light.

In a radiation detector according to an aspect of the present invention having an image sensor having a plurality of photoreceptor elements arranged thereon; and the scintillator panel.

BRIEF DESCRIPTION OF THE SEVERAL VIEWS OF THE DRAWING

FIG. 2 is a table showing the results obtained by measuring and comparing image definition characteristics of such scintillator panels.

DETAILED DESCRIPTION OF THE INVENTION

Hereinafter, an embodiment of the present invention will be described with reference to the drawings.

Figure 1:
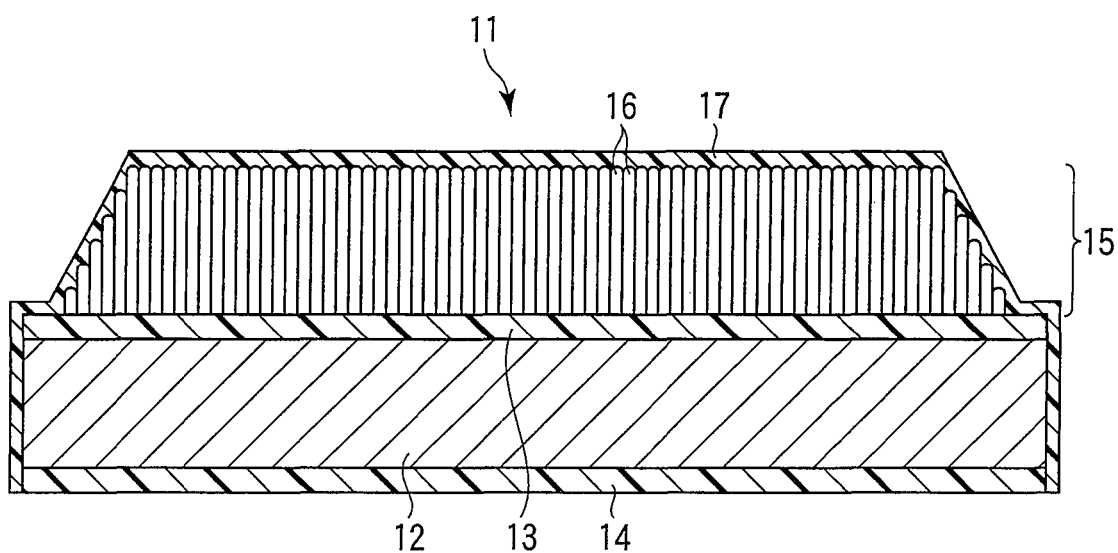
FIG. 1 is a cross-sectional view illustrating an embodiment of a scintillator panel according to the present invention.

FIG. 1 is a cross-sectional view illustrating a scintillator panel 11 having a supporting substrate 12 of a carbon fiber-reinforced plastic (hereinafter, referred to as CFRP), a reflective resin sheet 13 of a polyethylene terephthalate foam having a thickness of 190 μm (expanded PET) as a reflective film formed on one entire surface of the supporting substrate 12, and a resin sheet 14 of a polyethylene terephthalate foam (expanded PET) having a thickness of 190 μm, which is the same as that of the reflective resin sheet 13, formed on the other entire surface of the supporting substrate 12.

The supporting substrate 12 is prepared by laminating multiple fiber-reinforced base materials, impregnating the composite plate with a thermosetting resin, and then, heat-curing the resulting composite plate.

The reflective resin sheet 13 and the resin sheet 14 may be formed on both faces of the supporting substrate 12 while they are bonded to the supporting substrate 12 during molding. Then, the step of forming the reflective film in conventional processes may be eliminated, because the step of molding the supporting substrate 12 and the step of forming the reflective film are carried out simultaneously.

In addition, a phosphor layer 15, i.e., a scintillator layer, for example, of thallium-added cesium iodide (CsI:Tl), is formed on the surface of the reflective resin sheet 13 on one face of the supporting substrate 12 to a thickness of about 500 μm by vacuum deposition. The phosphor layer 15 has multiple columnar crystals 16 growing from the surface of the reflective resin sheet 13 in the columnar shape.

In forming the phosphor layer 15, the supporting substrate 12 carrying the sheets 13 and 14 bonded to both faces thereof is subjected to vacuum deposition in a vacuum evaporator, while a CsI-containing crucible and a TlI-containing crucible are placed at positions therein facing each other. When the substrate temperature is adjusted to 180° C. and the pressure in the vacuum evaporator to 0.4 Pa during vacuum deposition, columnar crystals 16 of TlI-activated CsI are formed on the surface of the reflective resin sheet 13 of the supporting substrate 12. The film deposition is terminated when the CsI film thickness reaches 500 μm, and the supporting substrate 12 carrying the formed CsI film is removed from the vacuum evaporator.

In addition, a moisture-proof layer 17 such as of poly-para-xylylene covering the surface of the phosphor layer 15, the surface and end face of the reflective resin sheet 13, the end faces of the supporting substrate 12 and the resin sheet 14 collectively is formed to a film thickness of about 15 μm by a thermal CVD method.

Results of measuring and comparing the image definition characteristics of the scintillator panels 11 in such a configuration are shown in FIG. 2.

The scintillator panel in Conventional Example 1 is a panel having a CFRP substrate and an Al reflective film, a CsI film, and a poly-para-xylylene film formed thereon.

The scintillation panel in Conventional Example 2 is a panel having a CFRP substrate and a reflective film of titanium oxide-dispersed resin paste coated thereon, a magnesium oxide protection film, a CsI film, and a poly-para-xylylene film formed thereon.

The scintillation panel in the present embodiment is a panel having a CFRP substrate and an expanded PET reflection sheet, a CsI film and a poly-para-xylylene film formed thereon.

As for the sensitivity characteristics, the scintillation panel 11 in the present embodiment has a relative sensitivity of 2.4 with respect to 1 of the sensitivity of intensifying screen, which is equivalent to or better than the sensitivity characteristics of the reflective film of Conventional Example 2, which is formed by coating a titanium oxide-dispersed resin paste. The CTF (image definition) at 2 Lp/mm in the present embodiment also remained similar to that in Conventional Example 2.

As described above, it is possible, by placing the resin reflective sheet 13 between the supporting substrate 12 and the phosphor layer 15, to eliminate the film-forming apparatus, for preparation of a metal reflective film higher in sensitivity characteristics and lower in cost, which is needed when a metal reflective film is used as the reflective film, to eliminate the coating step that is needed when a coat film formed by coating a granule-dispersed resin paste is selected as the reflective film, to eliminate control of coating irregularities, and consequently, to obtain a scintillator panel higher in sensitivity characteristics and more stabilized in quality than conventional panels at reduced cost.

It is also possible, by bonding a resin sheet 14 to the other face of the supporting substrate 12 opposite to the face bonded to the reflective resin sheet 13, to prevent bending of the supporting substrate 12 due to the difference in thermal expansion coefficient between the supporting substrate 12 and the reflective resin sheet 13 that may occur when only the reflective resin sheet 13 is used. The effect may be magnified if the material for the resin sheet 14 is the same as that for the reflective resin sheet 13.

It is also possible to improve the moisture resistance of the phosphor layer 15 by enclosing the phosphor layer 15 with the reflective resin sheet 13 and the moisture-proof film 17.

In such a case, the moisture-proof film 17 of poly-para-xylylene has a high bonding force to the reflective resin sheet 13, and thus, the moisture-proof film 17 is resistant to separation and thus, free from the concern about deterioration in moisture resistance.

Thus, when CsI is used as the phosphor layer 15, moisture resistance should be taken into consideration. The material has a lower moisture resistance and thus, the moisture-proof film 17 should be coated over the phosphor layer 15. Thermal CVD films of poly-para-xylylene are most commonly used as the moisture-proof film 17.

However, such a poly-para-xylylene film is less adhesive to metal and inorganic materials, and in particular, the external surface of the CsI-deposited region is vulnerable to film exfoliation. For example, as described in WO99/66350, it would be effective to solve the problem by making the region between the supporting substrate 12 and the moisture-proof film 17 irregular, but the method demands an additional step, and in particular, it is more complicated to make irregular the external surface of the CsI-deposited region, which is most vulnerable to exfoliation of the moisture-proof film 17, while retaining the roughness of the CsI-deposited region, in addition to the operation of forming a mask. The method also has a problem of the carbon fiber becoming split during surface modification processing such as polishing or sand blasting, which makes the resulting substrate less applicable to the CFRP substrate described above. It is thus possible to prevent separation of the moisture-proof film 17 and improve the moisture resistance of the phosphor layer 15, by enclosing the phosphor layer 15 with the reflective resin sheet 13 and the moisture-proof film 17, because the moisture-proof film 17 of poly-para-xylylene is more adhesive to the reflective resin sheet 13.

Specifically, the deterioration rates in CTF value of the CsI film in the structure disclosed in WO99/66350 (laminated structure: amorphous carbon substrate (peripheral irregular structure)/Al reflective film/CsI/poly-para-xylylene) and the CsI film in the present embodiment, when left under an environment at a temperature of 60° C. and a humidity of 90% for 24 hours, were respectively 11% and 0% at the center of the supporting substrate, showing that the structure of the scintillator panel in the present embodiment is slightly more favorable, but those in the most peripheral regions of the supporting substrates were respectively 44% and 0%, which are distinctively different. Further, with the CsI film in the present embodiment, no deterioration in the CTF value was observed over the area from the center to the periphery of the supporting substrate, even when stored under an environment at a temperature of 60° C. and a humidity of 90% for 176 hours (cumulative 200 hours).

Figure 3:
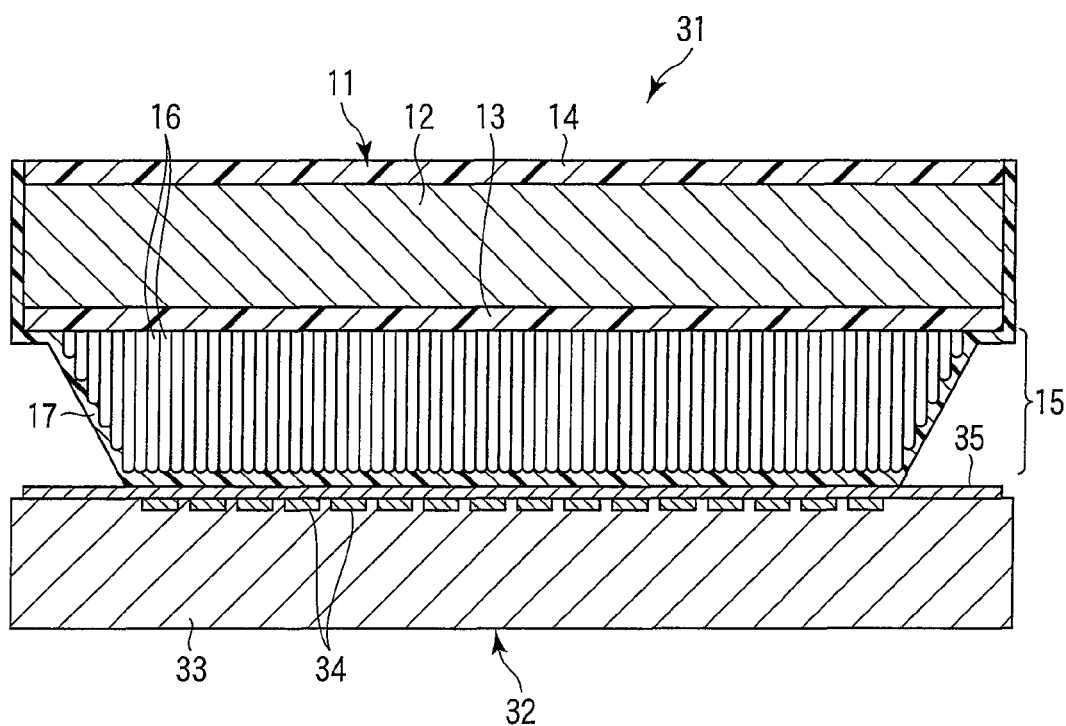
FIG. 3 is a cross-sectional view illustrating a radiation detector using the scintillator panel.

FIG. 3 is a cross-sectional view illustrating a radiation detector using the scintillator panel 11.

The radiation detector 31 is a planar detector in combination of the scintillator panel 11 and an image sensor 32 bonded thereto. The image sensor 32 has a glass plate 33 and multiple photoreceptor elements 34 such as photodiodes arranged in a matrix, switching elements selectively receiving the electrical signals from these photoreceptor elements 34, and other elements formed thereon. A flattening layer 35 is formed on the surface of the image sensor 32.

It is possible to improve the sensitivity characteristics by using the radiation detector 31 in combination of the scintillator panel 11 and the image sensor 32 bonded thereto.

Examples of the materials for the supporting substrate 12 include, in addition to CFRP, amorphous carbon, graphite, glass, beryllium, titanium, aluminum, and alloys thereof, ceramics (such as alumina, beryllia, zirconia, and silicon nitride), engineering plastics, and the like.

Phosphor layers 15 of CsI and CsBr have similar effects.

The radiation detector 31 in the embodiment above may have an image sensor 32 selected from TFT with photodiodes, CCD, and CMOS.

Desired effects are obtained whether the reflective resin sheet 13 is bonded to both faces of the supporting substrate 12 or bonded only to one face of the supporting substrate 12 and not to the other face of the supporting substrate 12. If the reflective resin sheet 13 is bonded only to one face of the supporting substrate 12, a resin layer of another resin sheet 14 is preferably bonded to the face of the supporting substrate 12 opposite to the face carrying the phosphor layer 15 formed.

A titanium oxide ($TiO_2$) granule-dispersed polyethylene terephthalate may be used as the material for the reflective resin sheet 13. It is possible by using the material to obtain favorable effects similar to those described above obtained by using the reflective resin sheet 13 of PET foam and to improve the sensitivity.

According to the present invention, it is possible, by placing a reflective resin sheet between a supporting substrate and a phosphor layer, to eliminate the film-forming apparatus, for preparation of a metal reflective film higher in sensitivity characteristics and cost, which is needed when a metal reflective film is used as the reflective film, to eliminate the coating step that is needed when a coat film formed by coating a granule-dispersed resin paste is selected as the reflective film, to eliminate control of coating irregularities, and consequently, to obtain a scintillator panel higher in sensitivity characteristics and more stabilized in quality than conventional panels at reduced cost.

What is claimed is:

1. A scintillator panel comprising:
   a supporting substrate which transmits a radiation ray;
   a reflective resin sheet formed directly on top of one face of the supporting substrate, the reflective resin sheet having a single layer made from foamed resin; and
   a phosphor layer which is formed directly on top of the reflective resin sheet disposed on the one face of the supporting substrate and converts the radiation ray into visible light.

2. A radiation detector comprising:
   an image sensor having a plurality of photoreceptor elements arranged thereon; and
   the scintillator panel according to claim 1 in combination of the image sensor.

3. A scintillator panel comprising:
   a supporting substrate which transmits a radiation ray;
   a reflective resin sheet formed on at least one face of the supporting substrate, the supporting substrate being made of carbon fiber-reinforced plastic (CFRP) impregnated with thermosetting resin, the reflective resin sheet having a single layer, the single layer being an expanded resin layer or dispersed with a grain of heterogeneous substance different from the resin in the resin sheet; and
   a phosphor layer which is formed on the reflective resin sheet on one face of the supporting substrate and converts the radiation ray into visible light,
   wherein the reflective resin sheet is bonded by resin, which is originally impregnated in a base material of CFRP before heat curing, to the CFRP supporting substrate.

4. A radiation detector comprising:
   an image sensor having a plurality of photoreceptor elements arranged thereon; and
   the scintillator panel according to claim 3 in combination of the image sensor.

* * * * *